April 20, 1965  R. A. BOZZOLA  3,179,210
TURBO-CHARGER SHAFT BRAKE
Original Filed March 1, 1962  2 Sheets-Sheet 1

INVENTOR.
Riccardo A. Bozzola
BY
Lockwood, Woodard, Smith & Weikart
Attorneys

United States Patent Office 3,179,210
Patented Apr. 20, 1965

3,179,210
TURBO-CHARGER SHAFT BRAKE
Riccardo A. Bozzola, Detroit, Mich., assignor to Schwitzer Corporation, Indianapolis, Ind., a corporation of Indiana
Original application Mar. 1, 1962, Ser. No. 176,697. Divided and this application Oct. 14, 1963, Ser. No. 316,102
3 Claims. (Cl. 188—170)

This invention relates generally to devices for the protection of turbocharger bearings when a turbocharged internal combustion engine is started, and more particularly relates to a brake device for preventing rotation of a tubocharger shaft until normal lubricating oil pressure has appeared at the turbocharger shaft bearings.

When a tubocharged internal combustion engine is started cold, an appreciable time interval will normally occur between engine starting and the appearance of lubricating oil under the desired pressure at the turbocharger bearings. If, during this time interval, load is applied to the engine, because of the increase in engine exhaust gas temperature and the increased exhaust gas flow, the turbocharger rotor will accelerate to high speed before satisfactory lubrication is established at the turbocharger shaft bearings. This lag in the build-up of lubricating oil pressure can result in serious damage to the turbocharger shaft bearings, particularly if journal or sleeve bearings are utilized.

The structure of the present invention protects turbocharger bearings against failure from oil lag. This is accomplished by providing a braking element which is biased into a position preventing rotation of the shaft but which is automatically released to permit rotation of the shaft when normal oil pressure appears at the turbocharger bearings.

The primary object of the present invention is to provide an apparatus for preventing rotation of a turbocharger shaft until lubricating oil is available under proper pressure at the shaft bearings.

A further object of the present invention is to provide an apparatus of the type referred to which will stop rotation of the turbocharger shaft should lubricating oil pressure to the shaft bearings fail.

A further object of the present invention is to provide an apparatus of the type referred to in which spring biased motion of an oil pressure responsive piston is transferred to a brake shoe moving in a direction normal to the turbocharger shaft axis to prevent rotation of the shaft, release of the braking action occurring upon response of the piston to a predetermined oil pressure.

These and other objects will become apparent as the description proceeds with reference to the accompanying drawings in which.

As is well known in the art, the conventional turbocharger comprises essentially a turbine and a compressor with the turbine and compressor rotors mounted on a unitary shaft which is hereinafter referred to as the turbocharger shaft. The turbine is driven by exhaust gases from the engine utilizing the turbocharger and functions to drive the turbocharger compressor which charges the engine cylinders with high pressure air. In the operation of a turbocharged engine the turbocharger shaft operates at relatively high speeds and lubrication of the turbocharger shaft bearings is quite important. In describing the structure of the present invention the portions of the turbocharger turbine and compressor are shown only fragmentarily and it will be understood that the turbocharger shaft referred to in the description is driven by the turbine rotor and drives the compressor rotor.

Figure 1:
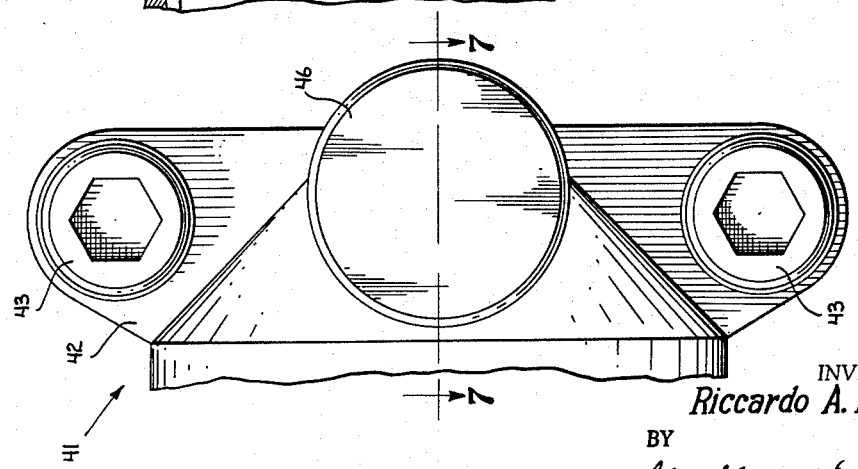
FIG. 1 is an end view of a device embodying the present invention.

Referring to the drawings, the structure includes a housing indicated generally at 41 in FIG. 1 having a flanged base portion 42 which is mounted by means of screws 43 upon bosses 44 welded to the bearing housing casting 16 of the turbocharger. It will be understood that the bosses could, of course, be integral with the housing and securing means other than screws 43 might be utilized. The housing 41 further includes a cylindrical portion 46 having a central bore 47. As may best be seen in FIGS. 2 and 3 the cylindrical portion is provided with a circular outwardly flanged portion 48. The flanged portion 48 is closed by a cap 49 which, on its inner surface, seats a resilient means in the form of a compression spring 51 and is provided with a drain aperture 50. The upper end, as viewed in FIG. 2, of the compression spring seats against a piston 52 which is slidable within the flanged portion 48. The outer end face of the piston 52 provides a movable wall 53 for the bore 47.

Figure 2:
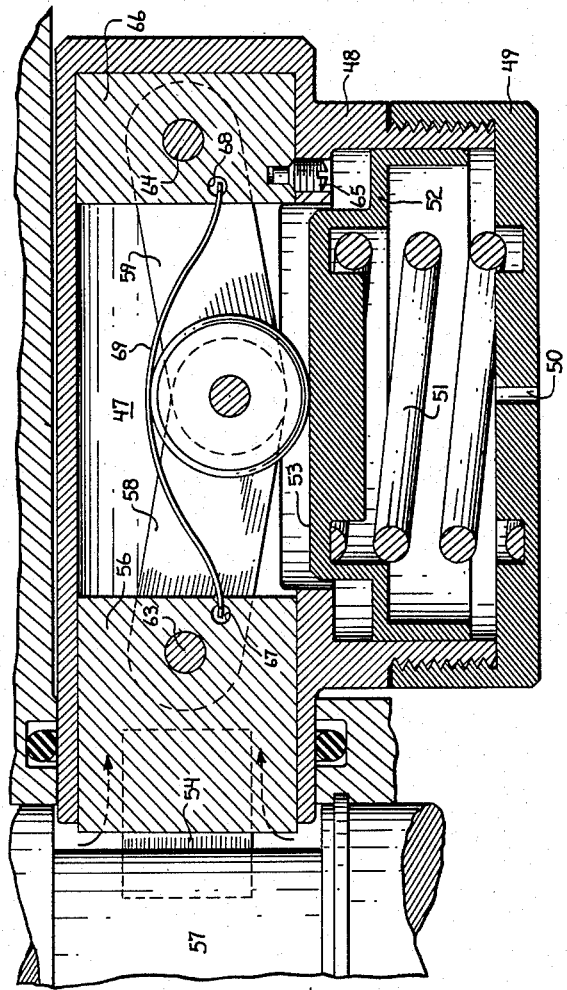
FIG. 2 is a sectional view taken generally along the lines 7—7 of FIG. 1.
Figure 3:
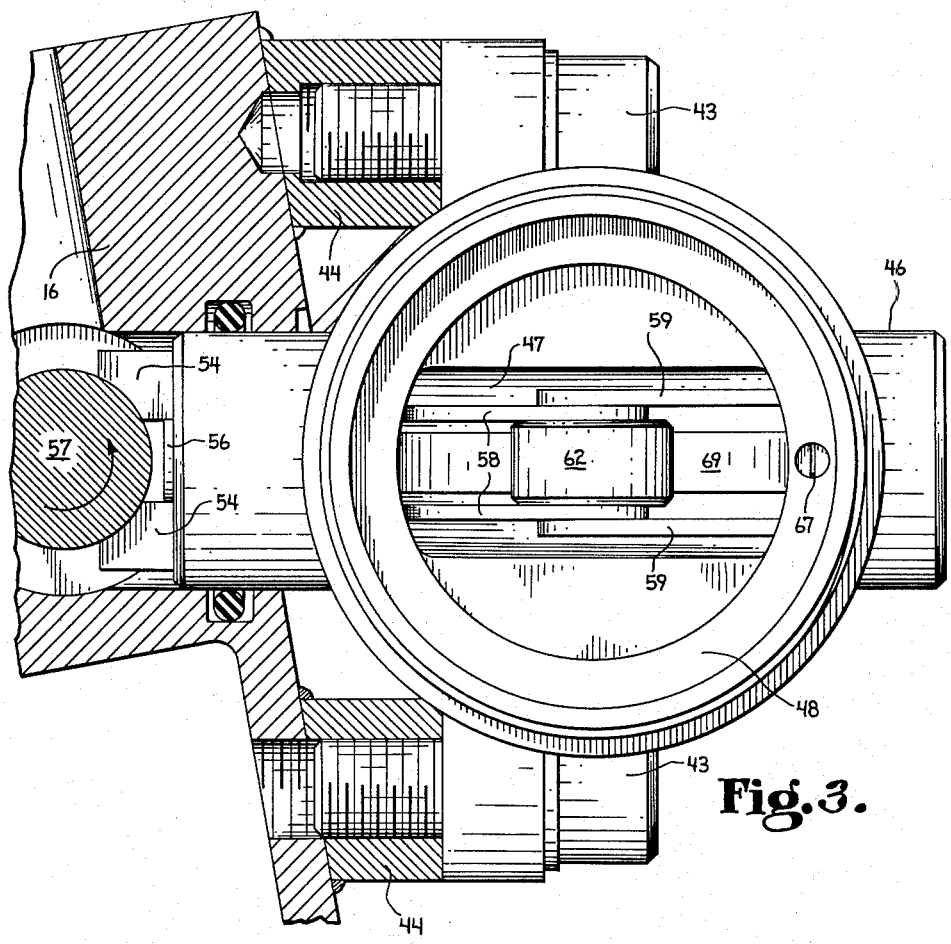
FIG. 3 is a bottom plan view of the structure of FIG. 2 but with portions removed to clarify the interior construction.
Figure 4:
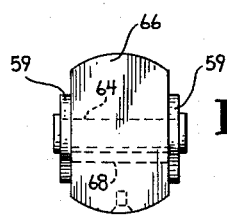
FIG. 4 is an end view of a portion of the structure shown in FIG. 2.

Referring now particularly to FIGS. 2 and 3 (and in FIG. 3 the cap 39, spring 51 and piston 52 are omitted to prevent obscuring of the parts to be described) the linkage and braking mechanism will now be described. The brake shoe assembly includes a brake shoe proper 54 which extends from a block 56 slidable within the bore 47. The block 56 fits closely within the bore 47 but has flattened, diametrically opposite sides similar to a block 66, to be subsequently described, shown in detail in FIG. 4. As may best be seen in FIG. 3 the shoe, at its end, is configurated to grip the turbocharger shaft 57 when force is applied to the shoe producing a tangential frictional force on the shaft resisting its rotation. Since the flattened sides of block 56 leave a space between the block and the bore wall, lubricating fluid adjacent the shaft 57 may flow inwardly into the bore 47 as indicated by arrows in FIG. 2.

A toggle linkage is disposed within the bore 47 and includes link members 58 and link members 59. The adjacent ends of the two pairs of links are pivotally joined by means of a pin 61 and a spacer 62. The opposite ends of the links 58 are pivotally joined by means of a pin 63 to the block 56. The corresponding ends of the links 59 are pivotally joined, by means of a pin 64, to a stationary block 66 held fixed within the bore by means of the set screw 65. Supported within opposed slots 67 and 68 in the blocks 56 and 66, respectively is a resilient leaf spring 69. The slots 67 and 68 retain the leaf spring but are formed so as to provide freedom of movement for the tips of the spring blade 69 and to permit a slight axial sliding movement of the leaf spring within the slots. The central portion of the leaf spring 69 engages the spacer 62 and lightly biases the pivotal junction of the links 58 and 59 away from the axial center line of the bore 47 and urges the spacer 62 into engagement with the movable wall 53. It will be understood that the force exerted by the spring 69 is far less than the force exerted by the spring 51 and serves merely to cause the spacer 62 to follow the movements of the movable wall 53 provided by the piston 52.

In operation, prior to the starting of the turbocharged engine the shaft 57 will, of course, be stationary and the force exerted by the spring 51 will, through the toggle linkage drive the shoe 54 into frictional engagement with the turbocharger shaft. Upon starting of the engine, and before the lubricating fluid reaches the desired pressure, the spring 51 will maintain the shoe 54 against the shaft 57 providing a frictional force resisting rotation of the shaft. As the lubricating fluid pressure within the bore 47 builds up to the predetermined value so as to overcome the force exerted by the spring 51 the movable wall 53 will be displaced downwardly as viewed in FIG. 2. The spring 69 will cause the pivotal junction of the links 58 and 59 to follow the downward movement of the wall 53 thereby moving the brake shoe assembly rightwardly as viewed in FIG. 2 and freeing the shoe from the shaft so that the shaft may rotate. With the bore or cavity 47 directly connected to the lubricating line of the turbocharger the build-up of pressure within the cavity and at the turbocharger shaft bearings will occur substantially simultaneously and the turbocharger rotor and turbocharger shaft will thus be permitted to rotate only after adequate lubricating pressure is established at the turbocharger bearings. It will be understood that if the angle between the toggle linkage members 58 and 59 and the axis of the bore 47 is kept relatively small, the force provided by the brake shoe 54 on the turbocharger shaft 57 can be much greater, that is, multiplied with respect to the force exerted by the spring 51.

While the housings for the devices of both FIGS. 1–3 have been described as mounted on the turbocharger bearing housing casting, it will be understood that these housings might be integrally formed with the casting.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A device for preventing rotation of a turbocharger shaft and capable of releasing the shaft for rotation upon the appearance of a predetermined lubricating fluid pressure within the device comprising: a housing having a central bore therein, said housing being supported adjacent the turbocharger shaft with the axis of its central bore normal to the shaft axis, a brake shoe assembly slidable within said bore with its motion in one direction limited by frictional engagement with said shaft, a toggle linkage disposed within said bore, said linkage comprising a first and second links, said first link having one end pivotally joined to said brake shoe assembly and its other end pivotally joined to one end of said second link, said second link having its other end pivotally supported by said housing, said links having a length dimension such that their pivotal junction lies to one side of the axis of said bore, a movable wall in said housing adjacent the junction of said links, resilient means urging said wall into engagement with said junction to move said link junction toward the bore axis and said shoe assembly into frictional engagement with the shaft, further resilient means relatively lightly biasing said link junction into engagement with said movable wall, and means for introducing lubricating fluid under pressure into said housing bore, whereby as said fluid attains a predetermined pressure, the force exerted by said first mentioned resilient means is overcome and said movable wall and link junction are moved away from said bore axis to displace said shoe assembly out of engagement with the shaft.

2. A device for preventing rotation of a turbocharger shaft and capable of releasing the shaft for rotation upon the appearance of a predetermined lubricating fluid pressure within the device comprising: a housing having a central bore therein, said housing being supported adjacent the turbocharger shaft with the axis of its central bore normal to the shaft axis, a brake shoe assembly slidable within said bore with its motion in one direction limited by frictional engagement with said shaft, a toggle linkage disposed within said bore, said linkage comprising a first and second links, said first link having one end pivotally joined to said brake shoe assembly and its other end pivotally joined to one end of said second link, said second link having its other end pivotally supported by said housing, said links having a length dimension such that their pivotal junction lies to one side of the axis of said bore, a movable wall in said housing adjacent the junction of said links, resilient means urging said wall into engagement with said junction to move said link junction toward the bore axis and said shoe assembly into frictional engagement with the shaft, and means for introducing lubricating fluid under pressure into said housing bore, whereby as said fluid attains a predetermined pressure the force exerted by said resilient means is overcome and said movable wall and link junction are moved away from said bore axis to displace said shoe assembly out of engagement with the shaft.

3. A device for preventing rotation of a turbocharger shaft and capable of releasing the shaft for rotation upon the appearance of a predetermined lubricating fluid pressure within the device comprising: a brake shoe assembly supported for motion transverse to the shaft axis with its motion in one direction limited by frictional engagement with said shaft, a toggle linkage, said linkage comprising a first and second links, said first link having one end pivotally joined to said brake shoe assembly and its other end pivotally joined to one end of said second link, said second link having its other end pivotally supported, stationary with relation to said brake shoe assembly, a pressure responsive member adjacent the junction of said links, resilient means urging said pressure responsive member into engagement with said link junction to move said link junction thereby disposing said shoe assembly in frictional engagement with the shaft, and means for presenting lubricating fluid under pressure to said pressure responsive member, whereby as said fluid attains a predetermined pressure the force exerted by said resilient means is overcome and said link junction is moved to displace said shoe assembly out of engagement with the shaft.

References Cited by the Examiner
UNITED STATES PATENTS 910,388   1/09   Junggren _____ 188—170
3,057,436  10/62  Jacobson et al. _____ 123—196 X ARTHUR L. LA POINT, *Primary Examiner.*